US011305473B2

(12) United States Patent
Prue

(10) Patent No.: US 11,305,473 B2
(45) Date of Patent: Apr. 19, 2022

(54) SYSTEM, APPARATUS AND METHOD FOR MANUFACTURING BRAID REINFORCED TUBING

(71) Applicant: PRUVEN TECHNOLOGIES, LLC, Griswold, CT (US)

(72) Inventor: James Prue, Griswold, CT (US)

(73) Assignee: PRUVEN TECHNOLOGIES, LLC, Griswold, CT (US)

(*) Notice: Subject to any disclaimer, the term of this patent is extended or adjusted under 35 U.S.C. 154(b) by 474 days.

(21) Appl. No.: 16/269,117

(22) Filed: Feb. 6, 2019

(65) Prior Publication Data

US 2019/0240710 A1 Aug. 8, 2019

Related U.S. Application Data

(60) Provisional application No. 62/626,968, filed on Feb. 6, 2018.

(51) Int. Cl.

*B29C 48/18* (2019.01)
*F16L 11/08* (2006.01)
*B29C 48/49* (2019.01)
*B29C 48/335* (2019.01)

(Continued)

(52) U.S. Cl.

CPC .............. *B29C 48/18* (2019.02); *B29C 48/09* (2019.02); *B29C 48/33* (2019.02); *B29C 48/335* (2019.02);

(Continued)

(58) Field of Classification Search

CPC ....... B21C 23/085; B29C 48/18; B29C 48/33; B29C 48/09; B29C 48/49; B29C 48/335;

(Continued)

(56) References Cited

U.S. PATENT DOCUMENTS 2,491,152 A * 12/1949 Beidle .................. B29D 23/001 156/393
3,281,897 A * 11/1966 Frank ...................... B29C 48/33 425/380

(Continued)

FOREIGN PATENT DOCUMENTS

EP 2797727 A1 11/2014
GB 1285607 A * 8/1972 ........... B29C 48/345

(Continued)

OTHER PUBLICATIONS

International Search Report dated May 6, 2019 issued in corresponding PCT Patent Application No. PCT/US19/16851.

(Continued)

*Primary Examiner* — Galen H Hauth
(74) *Attorney, Agent, or Firm* — Grogan, Tuccillo & Vanderleeden LLP

(57) ABSTRACT

An extrusion crosshead assembly for manufacturing braid reinforced tubing includes a body having a bore housing an outer deflector, an outer spline concentrically mounted within a bore of the outer deflector, an inner spline concentrically mounted within the outer spline and forming a plenum therebetween, an inner deflector concentrically mounted within a bore of the inner spline, and a hollow tip body mounted concentrically within a bore of the inner deflector.

19 Claims, 15 Drawing Sheets

10 44 50 46 22 20 14 12 28 48 42 84 62 36 38 56 26 58 60 32 16 52 27 14 70 24 54

(51) Int. Cl.

| | |
|---|---|
| ***B29C 48/33*** | (2019.01) |
| ***B29C 48/09*** | (2019.01) |
| ***B29C 48/16*** | (2019.01) |
| ***B29C 48/34*** | (2019.01) |

(52) U.S. Cl.
CPC ............ *B29C 48/49* (2019.02); *F16L 11/085* (2013.01); *B29C 48/16* (2019.02); *B29C 48/34* (2019.02)

(58) Field of Classification Search
CPC ......... B29C 48/16; B29C 48/34; B29C 48/21; B29C 48/338; B29C 48/301; B29C 48/2528
See application file for complete search history.

(56) References Cited

U.S. PATENT DOCUMENTS

| | | | | |
|---|---|---|---|---|
| 3,853,661 | A | 12/1974 | Sudo | |
| 4,138,503 | A | 2/1979 | Ziolko | |
| 4,182,603 | A | 1/1980 | Knittel | |
| 4,420,451 | A | 12/1983 | Rasmussen | |
| 5,288,529 | A | 2/1994 | Harvey et al. | |
| 5,538,411 | A | 7/1996 | Gates | |
| 5,690,972 | A | 11/1997 | Planeta et al. | |
| 6,073,657 | A * | 6/2000 | Hippelainen | B29C 48/151 138/125 |
| 6,077,062 | A | 6/2000 | Guillemette et al. | |
| 2004/0115293 | A1 | 6/2004 | Prue | |

FOREIGN PATENT DOCUMENTS

| | | | |
|---|---|---|---|
| SU | 542457 | A3 | 1/1977 |
| WO | 9212840 | A1 | 8/1992 |

OTHER PUBLICATIONS

International Search Report from corresponding PCT Application No. PCT/US2019/016851 dated Apr. 15, 2021.

* cited by examiner

A
44
10
50
46
60
38
54
A 100
60
56
90
94
27
200
214
14
216
218
48
52
26
16
20
22
28
30
62

SYSTEM, APPARATUS AND METHOD FOR MANUFACTURING BRAID REINFORCED TUBING

CROSS-REFERENCE TO RELATED APPLICATIONS

This application claims the benefit of U.S. Provisional Application Ser. No. 62/626,968, filed on Feb. 6, 2018, which is hereby incorporated by reference herein in its entirety.

FIELD OF THE INVENTION

The present invention relates to extruded tubing and, more particularly, to an apparatus and method for manufacturing braid reinforced tubing.

BACKGROUND OF THE INVENTION

Hoses and tubing for conveying fluids are well-known in the art. Some hoses are used for passage of a pressurized fluid, e.g., a hydraulic hose, or the like. Such hoses are required to have such a strength that they can withstand the high pressure of the fluid passed through the hose. To achieve a better pressure and kink resistance, hoses can be reinforced with extruded polymers or other strengthening filaments. Commonly used reinforcement methods are braiding, spiraling, knitting and wrapping.

Existing braided tubing or hoses can be classified as low tolerance braided tubing, or tight tolerance braided tubing. Conventional manufacturing methods for low tolerance braided tubing include extruding an inner layer, cooling the inner layer, applying a braid to the outer peripheral surface of the inner layer, and extruding an outer layer over the inner layer. Forming the inner layer, applying the braid, and extruding the outer layer are typically performed as discrete steps. In particular, at a first extruding station, the inner layer is formed and passed to a cooling bath. Once cooled, the inner layer is passed to a braiding station where spools of material are wound about the outer surface of the inner layer in a predetermined pattern. After braiding, the tubing is then passed to a second extruding station where the outer layer is formed over the inner layer and braid.

Tight tolerance braided tubing is formed in a similar manner, but requires additional steps to precisely control the inner diameter of the tube. For example, existing manufacturing methods for tight tolerance braided tubing include extruding an inner layer over a solid core that defines the inner diameter of the tube, spooling the inner layer, applying a braid to the inner layer, extruding an outer layer over the inner layer, and finally manually removing the core. Like with the manufacture of low tolerance tubing, forming the inner layer, applying the braid, and extruding the outer layer are typically performed as discrete steps. In particular, with tight tolerance tubing, at a first extruding station, the inner layer is formed over a core and passed to a cooling bath and then spooled. The inner layer is then passed to a braiding station where spools of material are wound about the outer surface of the inner layer in a predetermined pattern. After braiding, the tubing is then passed to a second extruding station where the outer layer is formed over the inner layer and braid. Finally, the core is manually removed from the tubing.

With either method, each spooling staging operation consumes valuable floor space, and the tubing is susceptible to contamination between extrusion and braiding operations (as it is passed from station to station) due to exposure to the ambient environment in a manufacturing facility. In addition, the use of two discrete extrusion steps can result in air column detection flaws. Moreover, the braiding machines that apply the braid to the inner tube are very loud, on the order of 140 decibels, creating an undesirable and potentially hazardous work environment. The production of tight tolerance tubing has the added drawback of requiring the use of a disposable core that is quite expensive, driving up the final cost of the product. In addition, the core must be removed after production by first cutting the tubing to length, which is very labor intensive and can cause defects in the internal diameter of the tubing if not removed properly.

In view of the above, there is a need for a system, apparatus and method for manufacturing both low and tight tolerance brain reinforced tubing that takes up less space on a shop floor, minimizes the possibility of contamination, and eliminates the expense and annoyance of using separate braiders to apply the braid to the inner tube.

SUMMARY OF THE INVENTION

It is an object of the present invention to provide a system and method for manufacturing braid reinforced tubing.

It is another object of the present invention to provide a system and method for manufacturing braid reinforced tubing that does not require spooling or the use of braiders.

It is another object of the present invention to provide a system and method for manufacturing braid reinforced tubing that minimizes the possibility of contamination.

It is another object of the present invention to provide a system and method for manufacturing braid reinforced tubing that does not require the use of a solid core.

It is another object of the present invention to provide a system and method for manufacturing braid reinforced tubing that obviates the need to utilize a monofilament for the braid.

It is another object of the present invention to provide a system and method for manufacturing braid reinforced tubing that allows for the stiffness of a particular tubing to be varied along its length.

These and other objects are achieved by the present invention.

According to an embodiment of the present invention, an extrusion assembly includes a head having an outer spline rotatable in a first direction and an inner spline mounted concentrically with the outer spline and rotatable in a second direction opposite the first direction, the outer spline and the inner spline defining a plenum, and an extruder device fluidly connected to the head and being configured to supply a molten braid material to plenum. The inner spline and the outer spline are operable to form an overlapping braid from the molten braid material.

According to another embodiment of the present invention, a method of manufacturing braid-reinforced tubing includes the steps of rotating an outer spline in a first direction, rotating an inner spline in a second direction opposite the first direction, the inner spline being concentrically mounted within the outer spline, and supplying a molten material to a plenum formed between a distal end of the outer spine and a distal end of the inner spline. The molten material exits the plenum through flow channels in the distal ends of the outer spline and the inner spline to form an overlapping braid pattern.

According to yet another embodiment of the present invention, an extrusion assembly includes a head having an outer spline rotatable in a first direction, an inner spline mounted concentrically with the outer spline and rotatable in a second direction opposite the first direction, the outer spline and the inner spline defining a plenum therebetween, and an outer deflector having a throughbore for receiving the inner spline and the outer spline. The extrusion assembly further includes a first extruder device fluidly connected to the head and being configured to supply a first molten material to plenum and a second extruder device fluidly connected to the head and being configured to supply a second molten material to the outer deflector. The inner spline and the outer spline are operable to form an overlapping braid from the molten braid material and apply the overlapping braid over a tube having a lumen, and the outer deflector is operable to form an outer layer over the overlapping braid.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
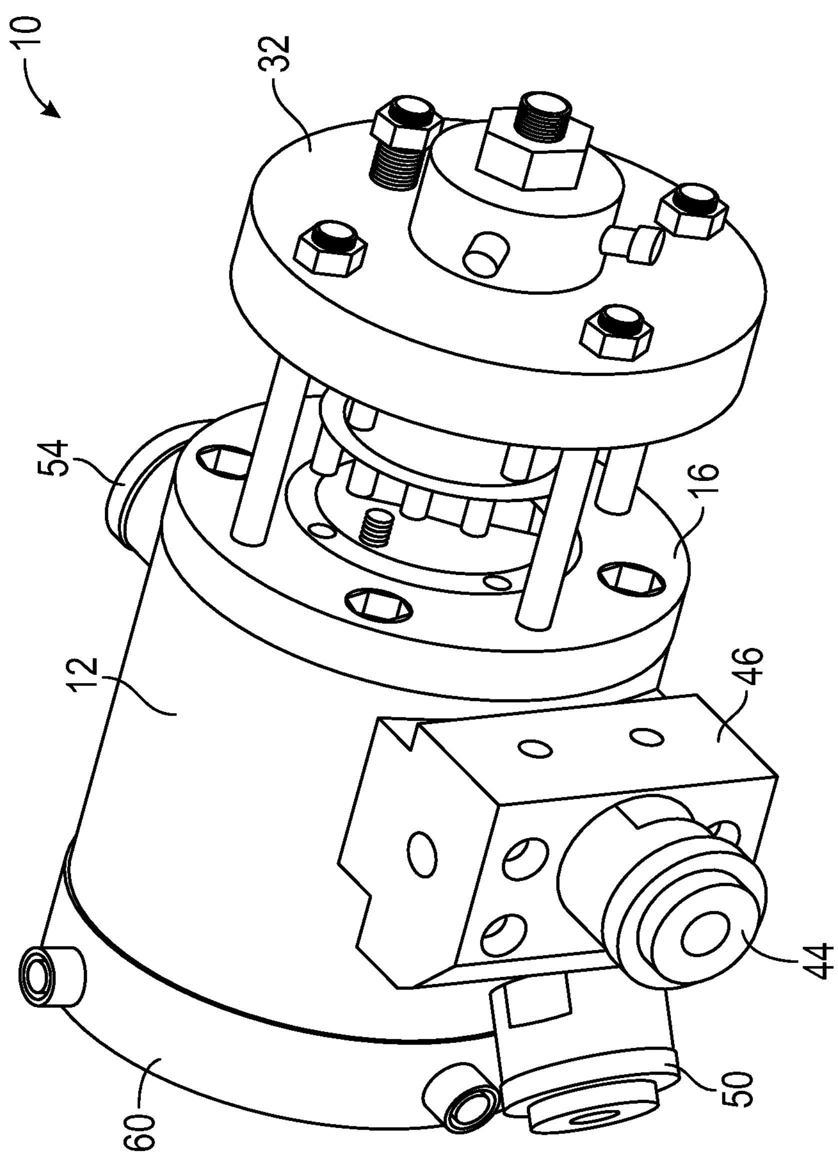
FIG. 1 is a perspective view of an extrusion crosshead assembly according to an embodiment of the present invention.
Figure 2:
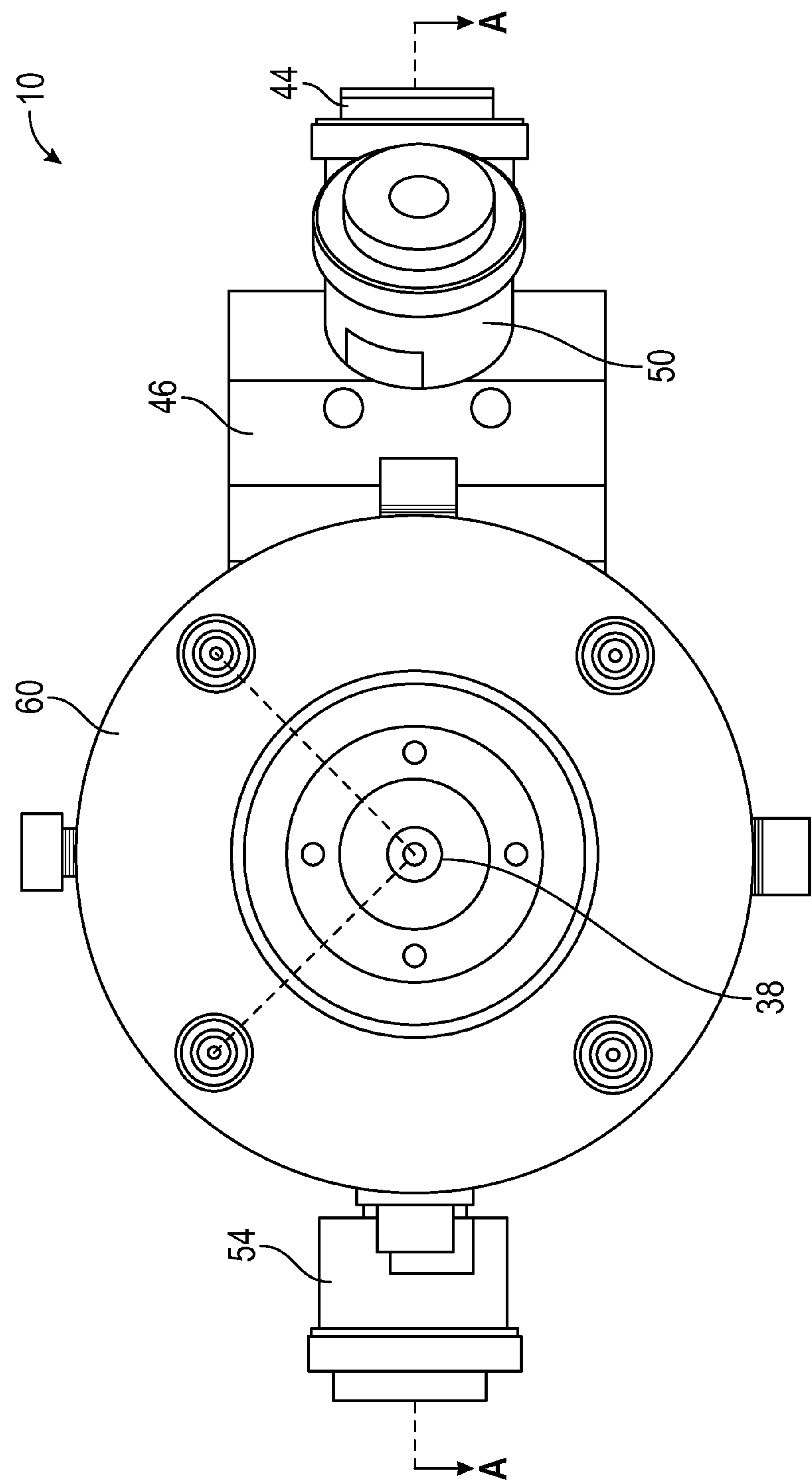
FIG. 2 is an end elevational view of the extrusion crosshead assembly of FIG. 1.
Figure 3:
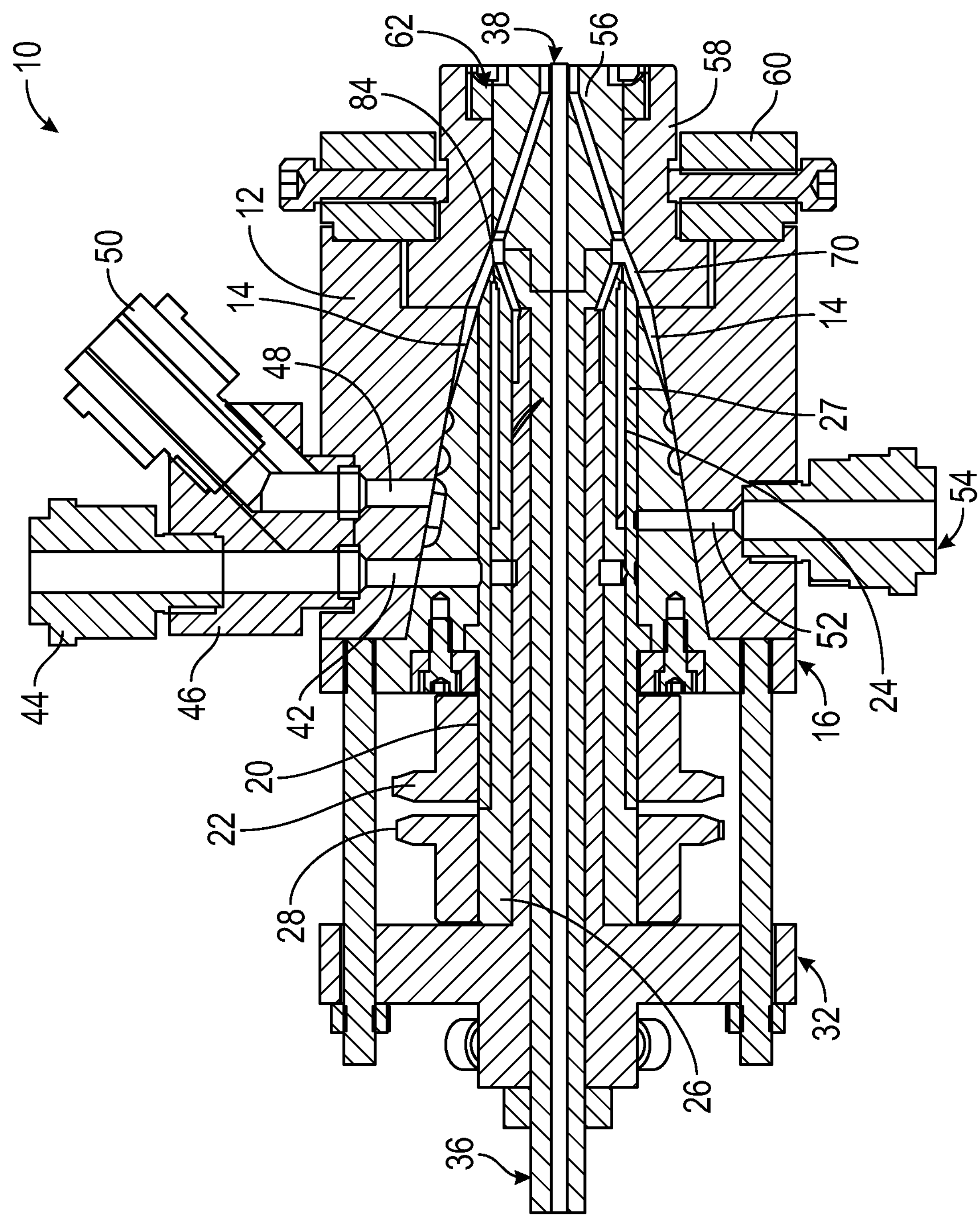
FIG. 3 is a cross-sectional view of the extrusion crosshead assembly taken along line A-A of FIG. 2.

With reference to FIGS. 1-3, an extrusion crosshead assembly 10 according to an embodiment of the present invention is illustrated. The crosshead assembly 10 includes a main body 12 having a main bore 14 extending therethrough. Within the main bore 14 is concentrically mounted an outer deflector 16 having a bore 18 extending therethrough, within which is concentrically mounted an outer spline 20. The outer spline 20 is operatively connected to an outer spline drive 22 that rotates the outer spline 20 about a central axis relative to the outer deflector 16. The outer spline 20 likewise includes a throughbore 24 within which is concentrically mounted an inner spline 26, forming a plenum 27 therebetween. The inner spline 26 is operatively connected to an inner spline drive 28 that rotates the inner spline 26 about the central axis. The inner spline 26 also includes a throughbore 30 within which is concentrically mounted an inner deflector 32. The inner deflector 32 includes a throughbore 34 that receives a longitudinal tip body 36 that terminates in an extrusion tip or mandrel 38. The tip body 36, for its part, includes a central passageway 40 extending therethrough, the purpose of which will be discussed hereinafter.

Within the main bore 14, therefore, there is a nested assembly including the outer deflector 16, the outer spline 20, the inner spline 26, the inner deflector 32 and the tip body 36. As best illustrated in FIG. 3, the extrusion crosshead assembly 10 further includes a first radial passage 42 that fluidly connects the bore 30 of the inner spline 26 with a first extruder through a first extruder adapter 44 and manifold 46 so that a first material may be supplied to the outer peripheral surface of the inner deflector 32, as discussed in detail hereinafter. As also shown therein, the extrusion crosshead assembly 10 also includes a second radial passage 48 that fluidly connects the main bore 14 of the main body 12 with a second extruder through a second extruder adapter 50 and manifold 46 so that a second material may be supplied to the outer peripheral surface of the outer deflector 16 as discussed hereinafter. In an embodiment, the manifold 46 may be a unitary component having a pair of flow channels therethrough for connection with the adapters 44, 50, although in other embodiments the manifold 46 may be a pair of structurally separate components each having a flow channel there through for connection with the respective first and second extruders. Importantly, as also shown in FIG. 3, the extrusion crosshead assembly 10 also includes a third radial passage 52 that fluidly connects the plenum 27 with a third extruder through extruder adapter 54 for supplying a third material to the plenum 27.

Referring still further to FIG. 3, in an embodiment, the extrusion crosshead assembly 10, at a downstream end thereof, may include a die 56 having an extrusion hole, a die holder 58, a die retainer 60, and a die nut 62. The mandrel or extrusion tip 38 is mounted in a conical inlet in the die 56. This arrangement is referred to as a "tube-on-tube assembly". In certain embodiments, these components may be omitted from the extrusion crosshead assembly 10.

Figure 4:
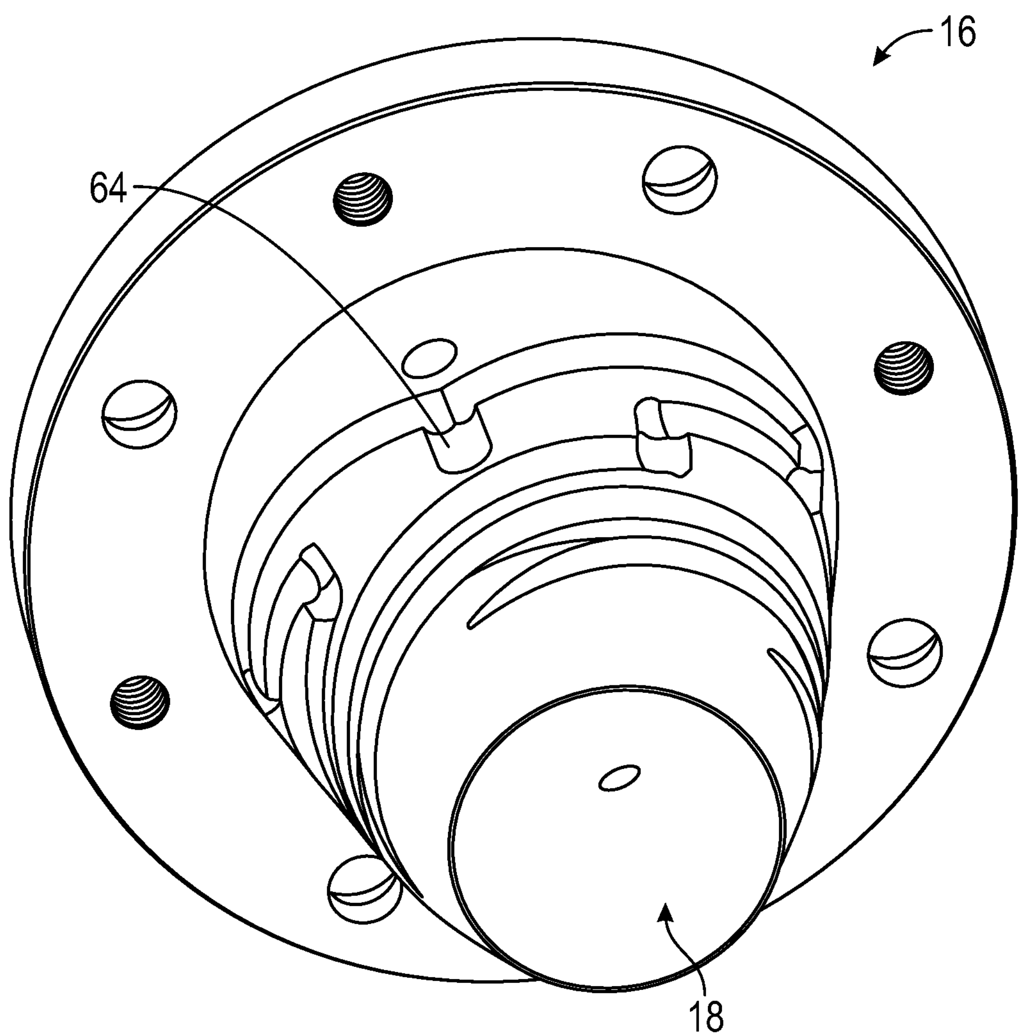
FIG. 4 is a perspective view of an outer deflector of the extrusion crosshead assembly of FIG. 1.

Turning now to FIG. 4, a detailed, perspective view of the outer deflector 16 is illustrated. As shown therein, the outer deflector 16 has a generally tapered or frusto-conical shape and has a plurality of spiral channels 64 formed in a peripheral surface thereof that function to distribute the second material received from the second extruder to an outer material flow channel 14 formed between the outer deflector and the main body 12. While FIG. 4 illustrates one exemplary configuration for the spiral channels 64, other configurations that uniformly distribute the second material around the periphery of the tapered portion of the outer deflector 16 may also be implemented without departing from the broader aspects of the present invention.

Figure 5:
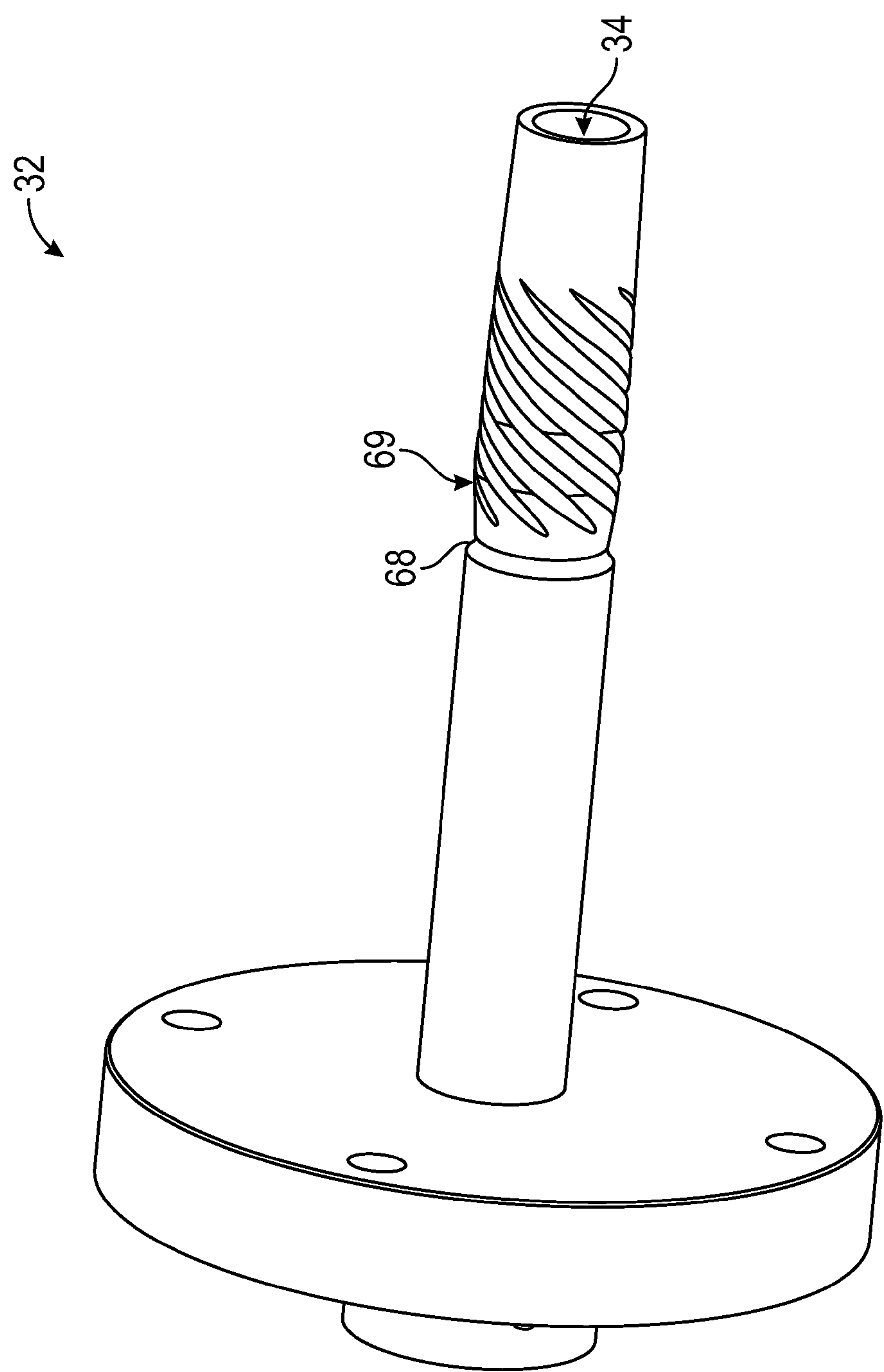
FIG. 5 is a perspective view of an inner deflector of the extrusion crosshead assembly of FIG. 1.

With reference to FIG. 5, the inner deflector 32 includes an annular groove 68 upon which the first material is fed from the first extruder. As shown therein, the inner deflector 32 likewise includes a series of spiral channels 69 formed in a peripheral surface thereof that function to distribute the first material to an inner material flow channel 70. As with channels 64 of the outer deflector 16, other configurations of the channels 69 of the inner deflector 32 are also envisioned.

Figure 6:
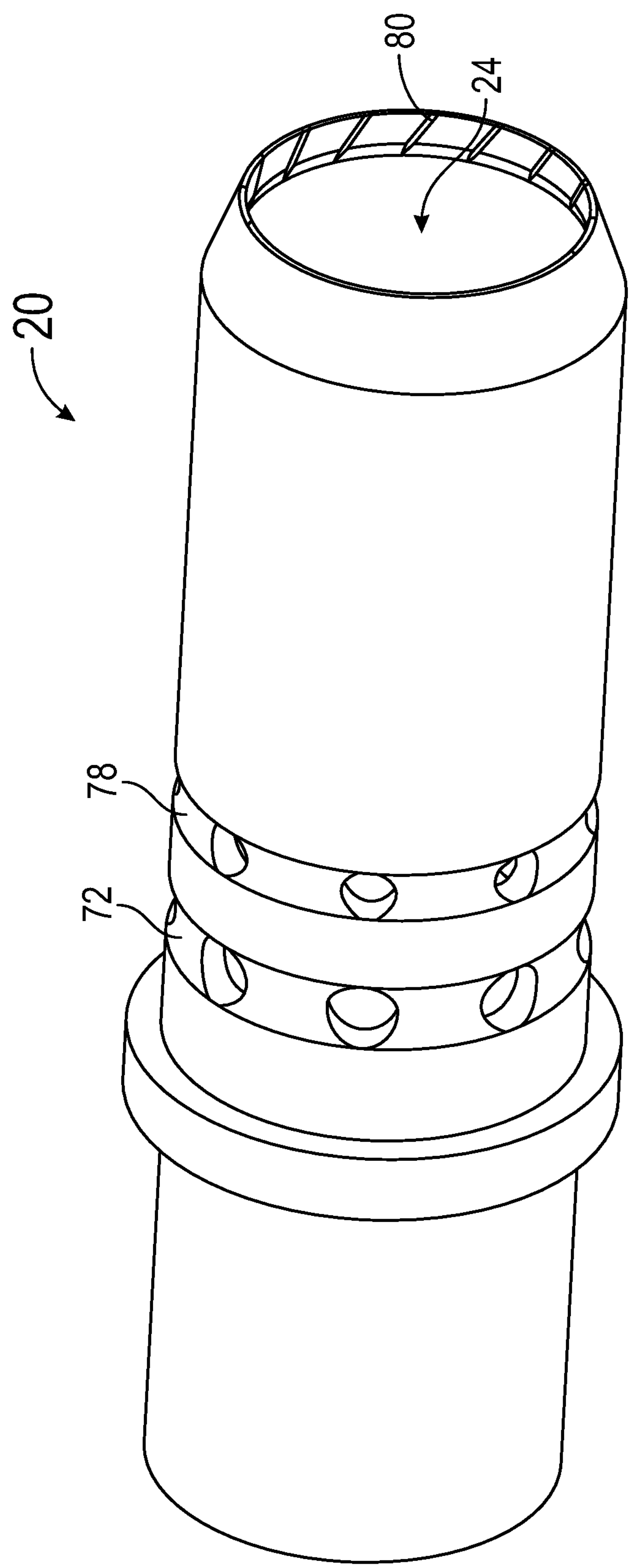
FIG. 6 is a perspective view of an outer spline of the extrusion crosshead assembly of FIG. 1.
Figure 7:
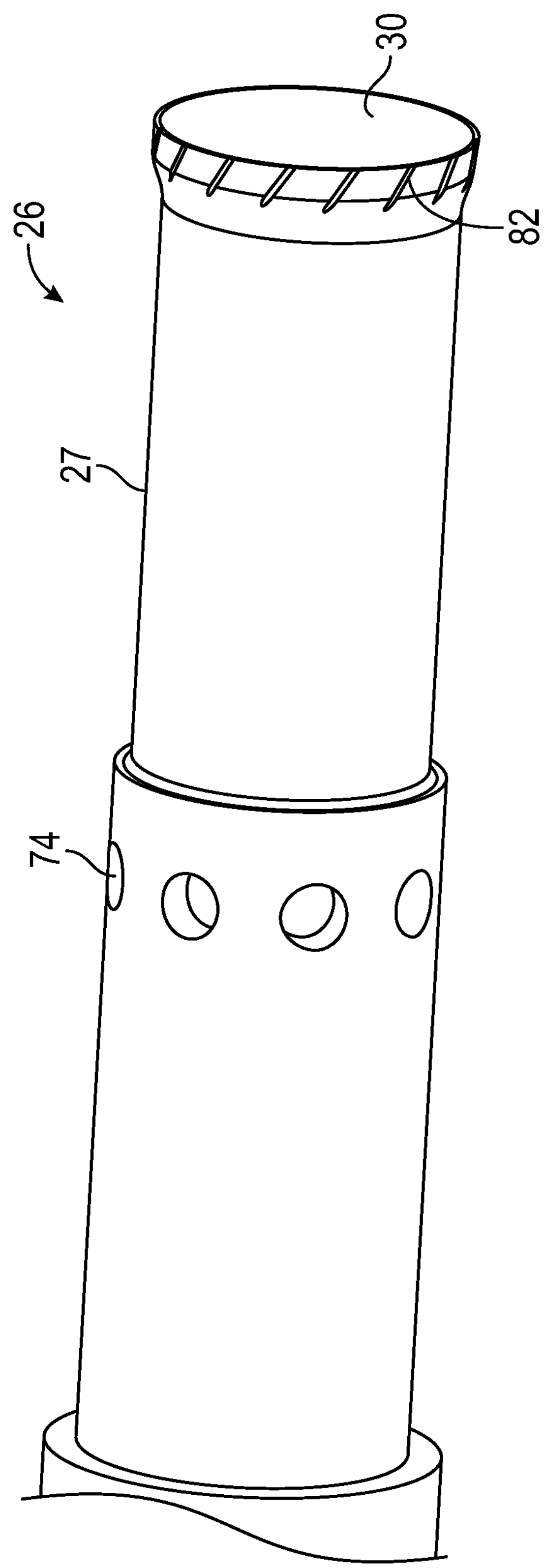
FIG. 7 is a perspective view of an inner spline of the extrusion crosshead assembly of FIG. 1.

Referring to FIGS. 6 and 7, detailed, perspective views of the outer and inner splines 20, 26, respectively, are shown. The outer spline 20 and inner spline 26 are both generally cylindrical in shape and each include a first ring of radial apertures 72, 74 that allows the second material from the second extruder to pass therethrough to feed the inner deflector 32 (via the annular groove 68). As illustrated in FIG. 6, the outer spline 20 also includes a second ring of radial apertures 78 disposed longitudinally closer to the tip 38 than the radial apertures 72. This second ring of radial apertures 78 allow the third material from the third extruder to enter the plenum 27 formed between the inner spline 26 and the outer spline 20.

Figure 8:
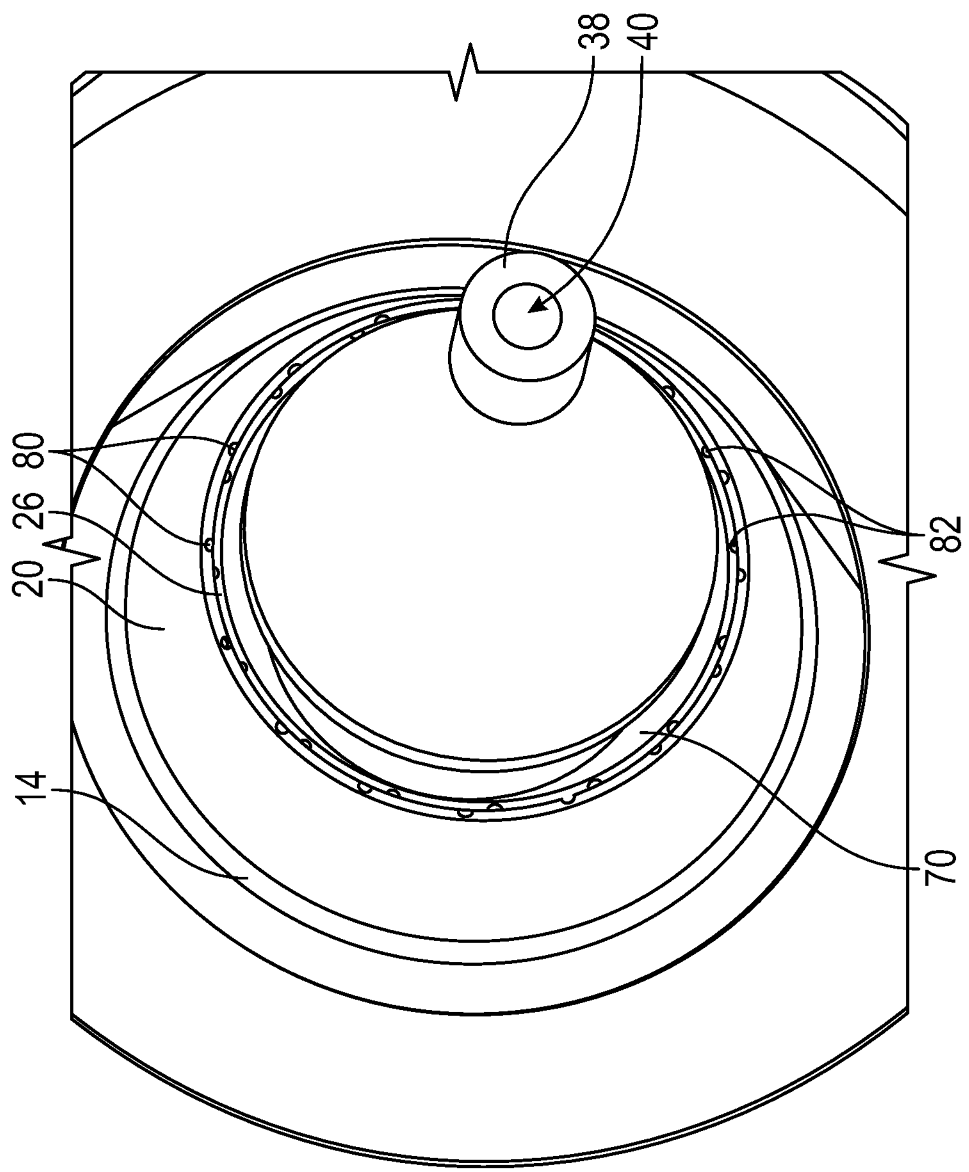
FIG. 8 is an enlarged, perspective view of an outlet end of the extrusion crosshead assembly of FIG. 1.

As further shown therein, the outer spline 20 includes a plurality of angled flow channels 80 formed in an inner peripheral surface thereof at a downstream end of the outer spline 20, while the inner spline includes a plurality of angled flow channels 82 formed on an outer peripheral surface thereof at a downstream end of the inner spline 26. The orientation of these flow channels 80, 82 is better shown in FIG. 8. These flow channels 80, 82, allow for the third material to be distributed in between the inner material flow channel 70 and the outer material flow channel 14, to form a braid therebetween in the manner hereinafter described. While the flow channels 80, 82 are shown in an angled configuration, in other embodiments the flow channels 80, 82 may be aligned parallel to the central axis of the crosshead. Reference numeral 84 in FIG. 3 indicates the location of the third material flow from the third extruder.

In operation, the tip body 36 is connected to a source of pressurized air (not shown), and a flow of pressurized air is passed through the central passageway 40 of the tip body 36 to tip 38. A first material, such as a thermoplastic, rubber or silicone, may be prepared in the first extruder in a manner heretofore known in the art, and fed in a molten state to the inner deflector 32 through the first radial passage 42 to form an inner tube portion of a braid reinforced tubing. A third material, such as nylon or other material, is fed in a molten state from the third extruder through the third radial passage 52 to the plenum 27 formed by the inner spline 26 and outer spline 20. From the plenum 27, the third material is distributed through the angled flow channels 80, 82 in the outer spline 20 and inner spline 26. In particular, in an embodiment, the outer spline drive 22 is configured to rotate the outer spline 20 counterclockwise (when viewed from the output end of the extrusion crosshead assembly 10) to distribute the third material in a counterclockwise pattern on the outer periphery of the inner tube, while the inner spline drive 28 is configured to rotate the inner spline 26 clockwise to distribute the third material in a clockwise pattern on the inner tube. This operation forms a crossing or overlapping reinforcing braid on the outer surface of the inner tube. In an embodiment, the outer spline 20 may alternatively rotate clockwise while the inner spline 26 rotates counterclockwise. It is this counter-rotation that provides for an overlapping braid.

Figure 9:
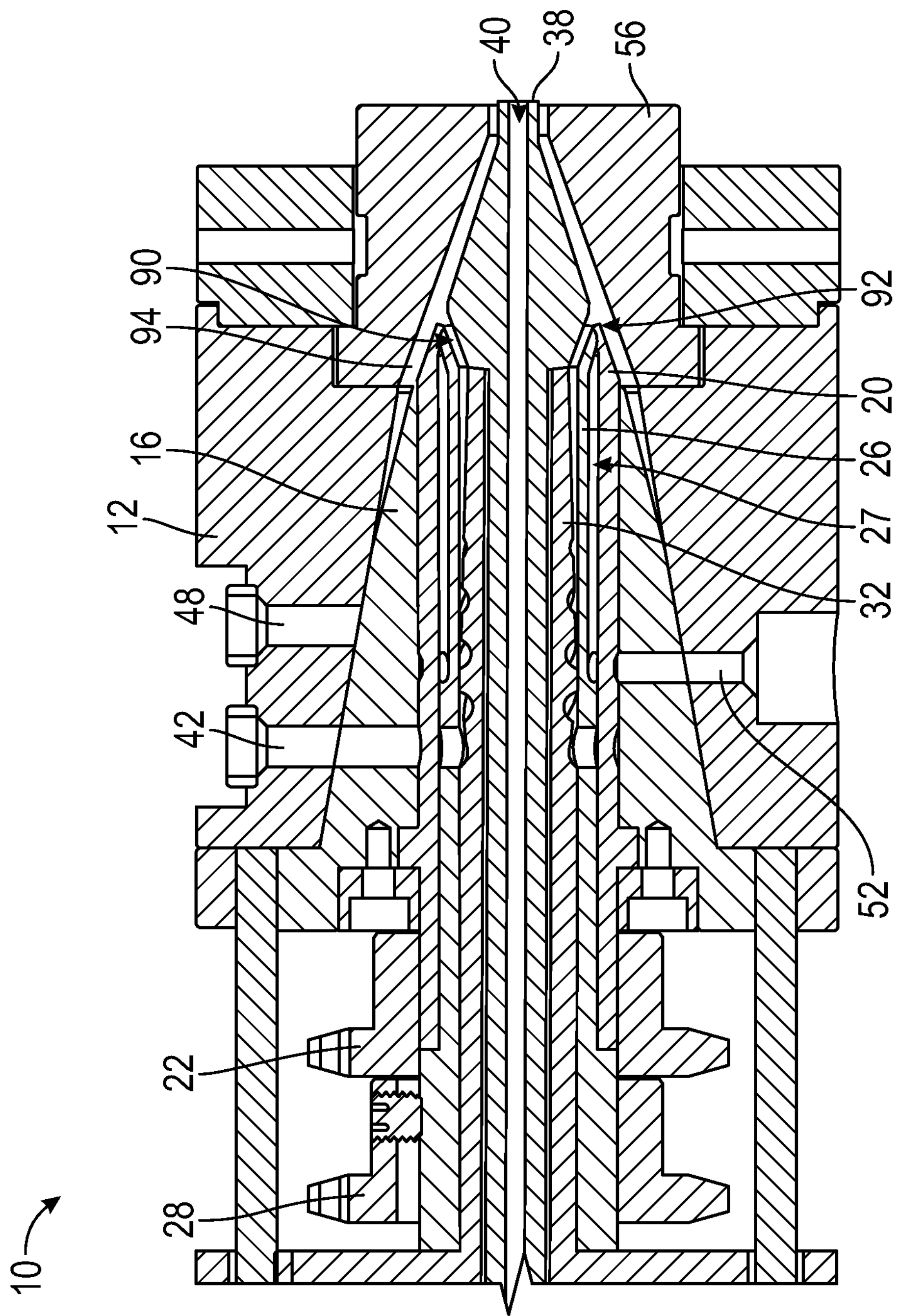
FIG. 9 is a simplified, cross-sectional illustration of the extrusion crosshead assembly of FIG. 1.
Figure 10:
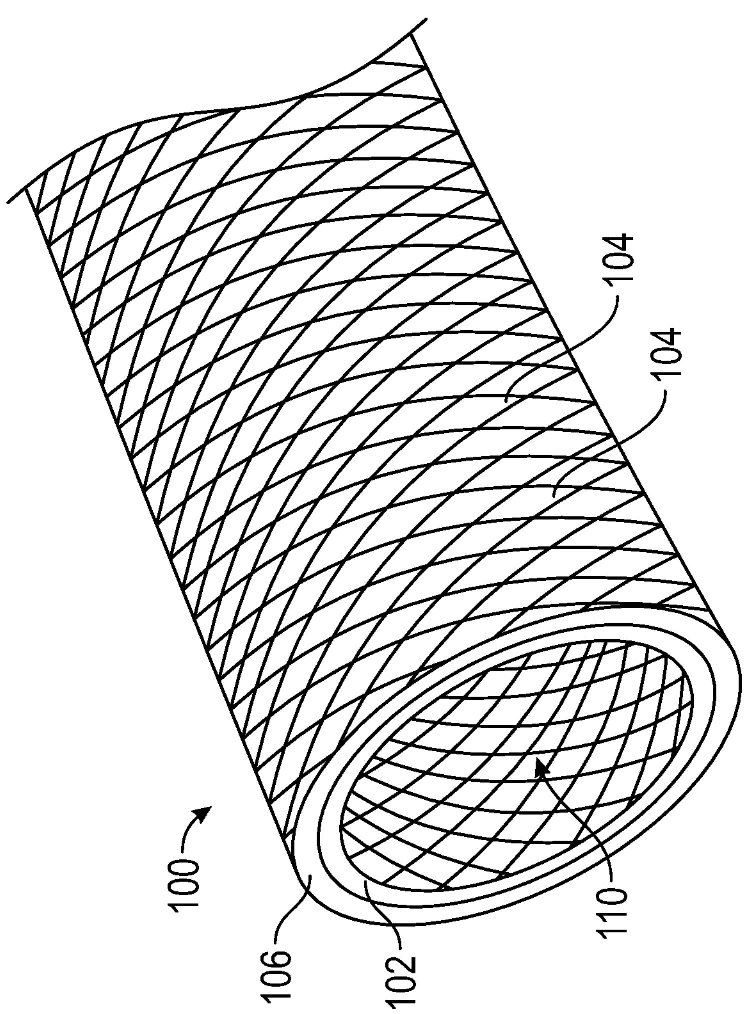
FIG. 10 is a perspective view of braid reinforced tubing manufactured according to an embodiment of the present invention.

A second material, which may be the same as, or different from, the first material, may be prepared in the second extruder in a manner heretofore known in the art, and fed in a molten state to the outer deflector 16 through the second radial passage 48 to form an outer tube portion over the inner tube portion and the braid. In an embodiment, the inner tube portion, braid, and outer tube portion are formed substantially simultaneously through the simultaneous feeding of the first material, second material and third material from the first, second and third extruders, respectively (through the associated extruder adapters). FIG. 9 more clearly illustrates the locations of the inner material flow 90 (from the first extruder) for forming the inner tube portion, the braid material flow 92 (from the third extruder) for forming the braid on the inner tube portion, and the outer material flow 94 (from the second extruder) for forming the outer tube portion over the inner tube portion and the braid. FIG. 10 illustrates an exemplary braid reinforced tubing 100 manufactured using the system and method of the present invention, and shows inner tube portion 102 having an interior lumen 110, braid 104, and outer tube portion 106. In an embodiment, the material used for the braid may be from the same or different family of materials than the material that forms the inner and outer layers.

Importantly, the pressure of the air provided through the central passageway 40 of the tip body 36 may be controlled to selectively control the inner diameter of the tubing produced. This column of air can be controlled rather precisely to tightly control the tolerance of inner diameter of the tubing, obviating the need to use a solid core for tight tolerance applications. As no solid core is required to precisely control the inner diameter of the tubing, tight tolerance tubing produced by the system, apparatus and method of the present invention can be coiled for storage and shipment, which has heretofore not been possible with prior art systems and methods due to the presence of the solid core. Obviating the need to utilize a solid core to achieve tight tolerance tubing also eliminates the tedious manual step of removing the solid core. In an embodiment, the tolerance of the inner diameter of the tubing can be precisely controlled down to about +/−0.001 inches by controlling the pressurized air passed through the tip body 36.

Figure 12:
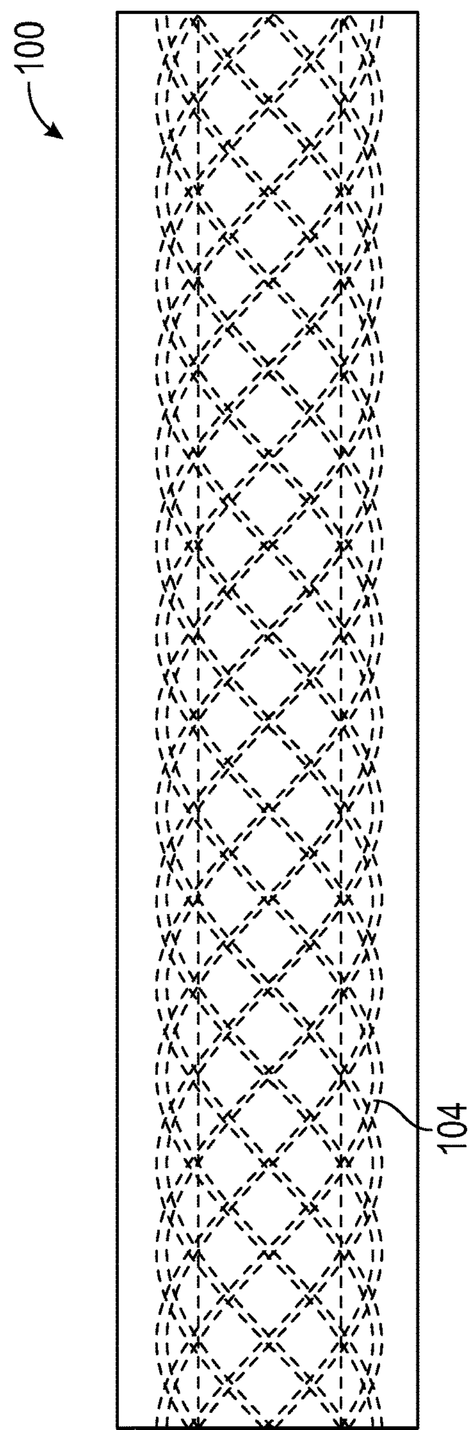
FIG. 12 is a top plan view of the braid reinforced tubing manufactured according to an embodiment of the present invention, illustrating a pick.
Figure 11:
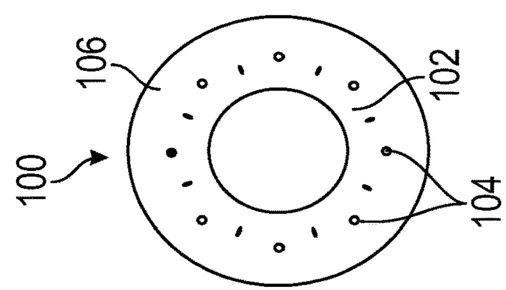
FIG. 11 is an axial end view of braid reinforced tubing manufactured according to an embodiment of the present invention.

It is contemplated that the inner spline 26 and outer spline 20 can be driven by any type of mechanism that produces rotational movement, for example, belts, pulleys, sprockets, etc. In an embodiment, the inner spline and outer spline 20 may be driven by dedicated motors, although a shared/common motor may also be utilized by employing gearing or bevel gears. With reference to FIGS. 11 and 12, importantly, the braid angle and the pick count (the number of crossovers per inch) may be varied by varying the spline speed and/or the number of splines. This allows the stiffness of a particular section of tubing to be varied along its length (i.e., by selectively varying the pick count). In particular, by increasing the rotational speed of one or both of the splines 20, 26, the pick count may be increased. Similarly, the pick count may be decreased by decreasing the rotational speed of one or both of the splines 20, 26. In addition to being able to control the stiffness of the tubing to be varied along its length almost instantaneously, the system and method of the present invention also allows for the formation of a taper within the tubing (i.e., tapered tubing). In connection with the above, it is contemplated that the three extruders, the motors for the splines, and the air pressure within the tube body can be controlled by a controller operating according to a preprogrammed set of instructions.

The extrusion crosshead assembly 10 of the present invention may be utilized to manufacture a variety of hoses and tubing for a variety of applications. For example, medical applications may include tubing for high pressure contrast injection lines, vascular access, e.g., dialysis, PICC and CVC catheters, interventional cardiology, vacuum procedures and radiology procedures, among others. Moreover, industrial and other applications may include reinforced beverage tubing, pressurized air delivery lines and air tools, appliance water delivery lines, hydraulic control lines, automotive lines, petroleum transfer lines, as well as hosing and tubing for material transfer systems, metering pumps and robotics.

The use of three extruders feeding a single crosshead to substantially form the inner tube, braid and outer tube simultaneously at a single point (i.e., within the die 56) within the crosshead 10 substantially minimizes or eliminates the possibility of contamination between layers. This is in contrast to prior art where the steps of forming the inner tube portion, braiding and outer tube portion were carried out at different, spaced locations along a fairly lengthy manufacturing line, where the various layers we exposed to ambient air between steps. Moreover, by integrating these three formerly discrete steps into a single apparatus, valuable space on the manufacturing floor can be freed up.

Further, the extrusion crosshead assembly of the present invention forms the braid between the inner and outer layers simultaneously with the formation of the inner and outer layers, by using a third extruder supplying molten braid material to the rotating inner and outer splines. This allows for the elimination of expensive and noisy braiders, as well as the spools of monofilament from which the braiding has heretofore been formed. In particular, in contrast to existing systems and methods which required many spools of monofilament to be unwound and applied to the inner tube portion by expensive braiders, the present invention eliminates the use of any monofilament and the associated braiders, and instead forms the braid from a molten material that is applied to the inner tube portion within the crosshead.

Figure 13:
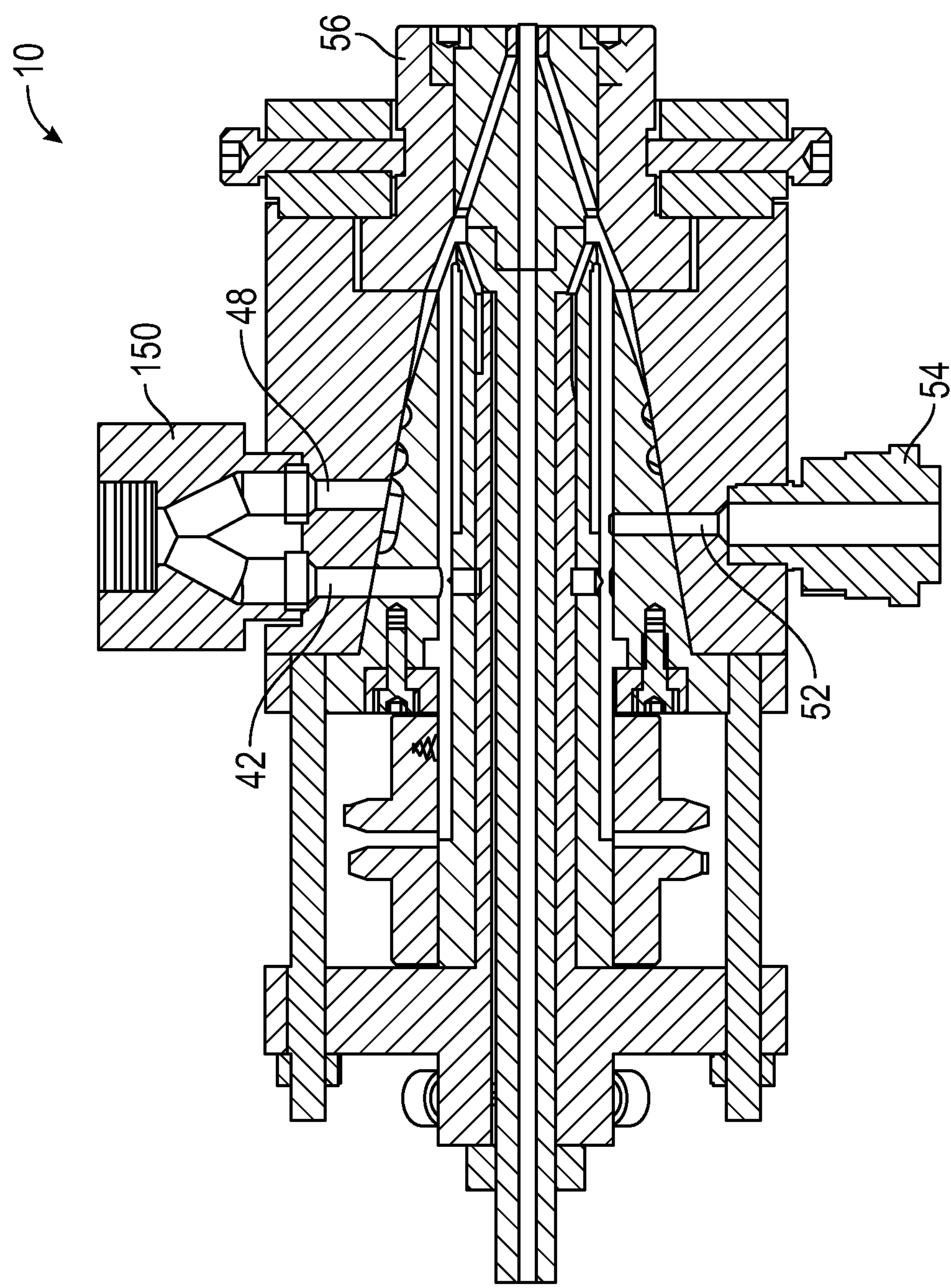
FIG. 13 is a simplified, cross-sectional illustration of an extrusion crosshead assembly that utilizes a single manifold to supply the material for the inner and outer tube layers, according to another embodiment of the present invention.

With reference to FIG. 13, where the inner tube material and outer tube material are the same, a single extruder and single manifold 150 may be utilized to feed both the inner and outer layers of the tubing. In an embodiment, the crosshead may be used to provide multi-lumen tubing by feeding another extruder through the tip body. It is also contemplated that the crosshead assembly may be modified to allow for spiral reinforcement of the tubing. In particular, by keying the inner and outer splines together and rotating in one direction, a spiral reinforcement braid can be achieved.

Figure 14:
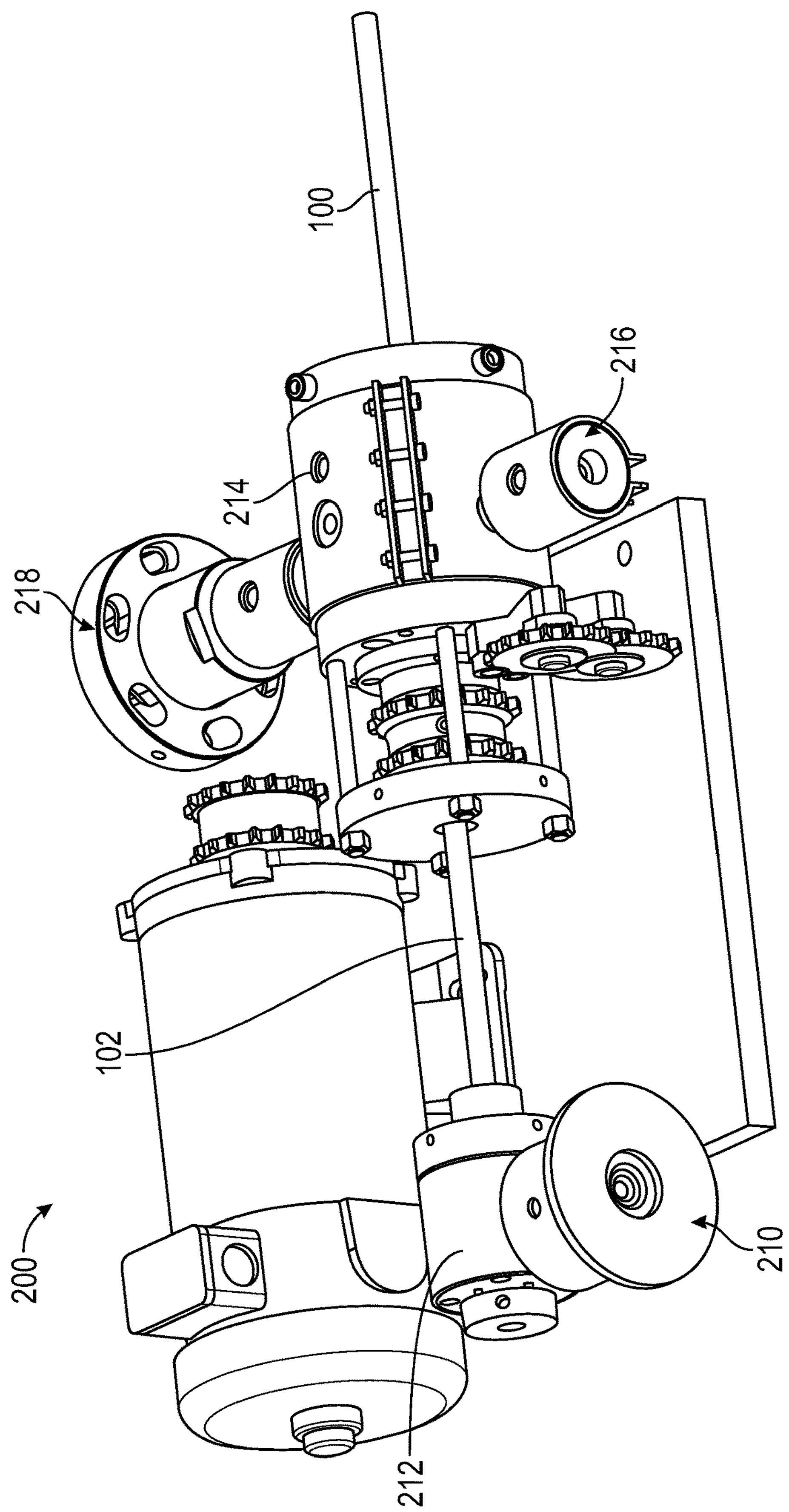
FIG. 14 is a perspective illustration of an extrusion assembly, according to another embodiment of the present invention.
Figure 15:
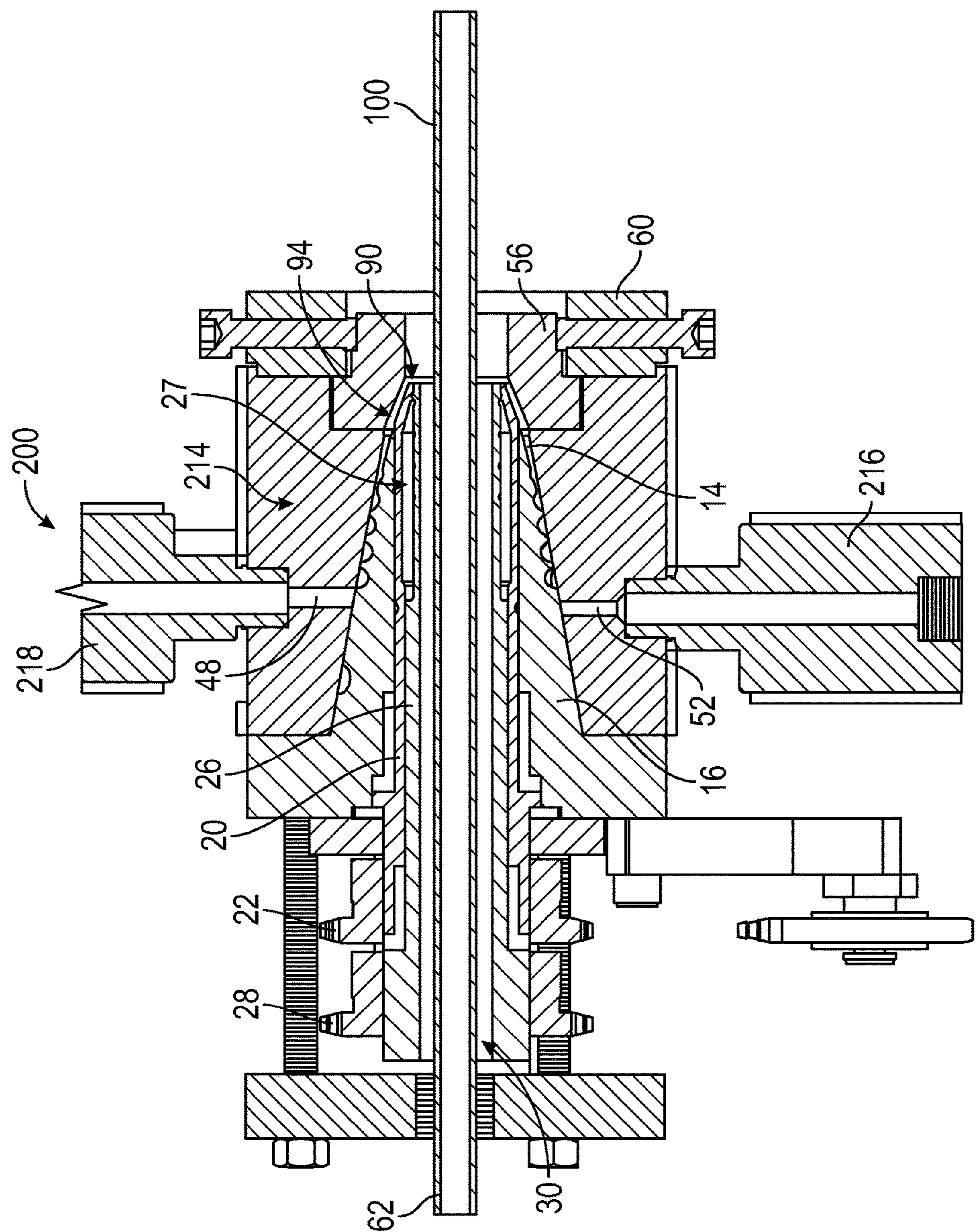
FIG. 15 is a cross-sectional illustration of a portion of the extrusion assembly of FIG. 14.
Figure 16:
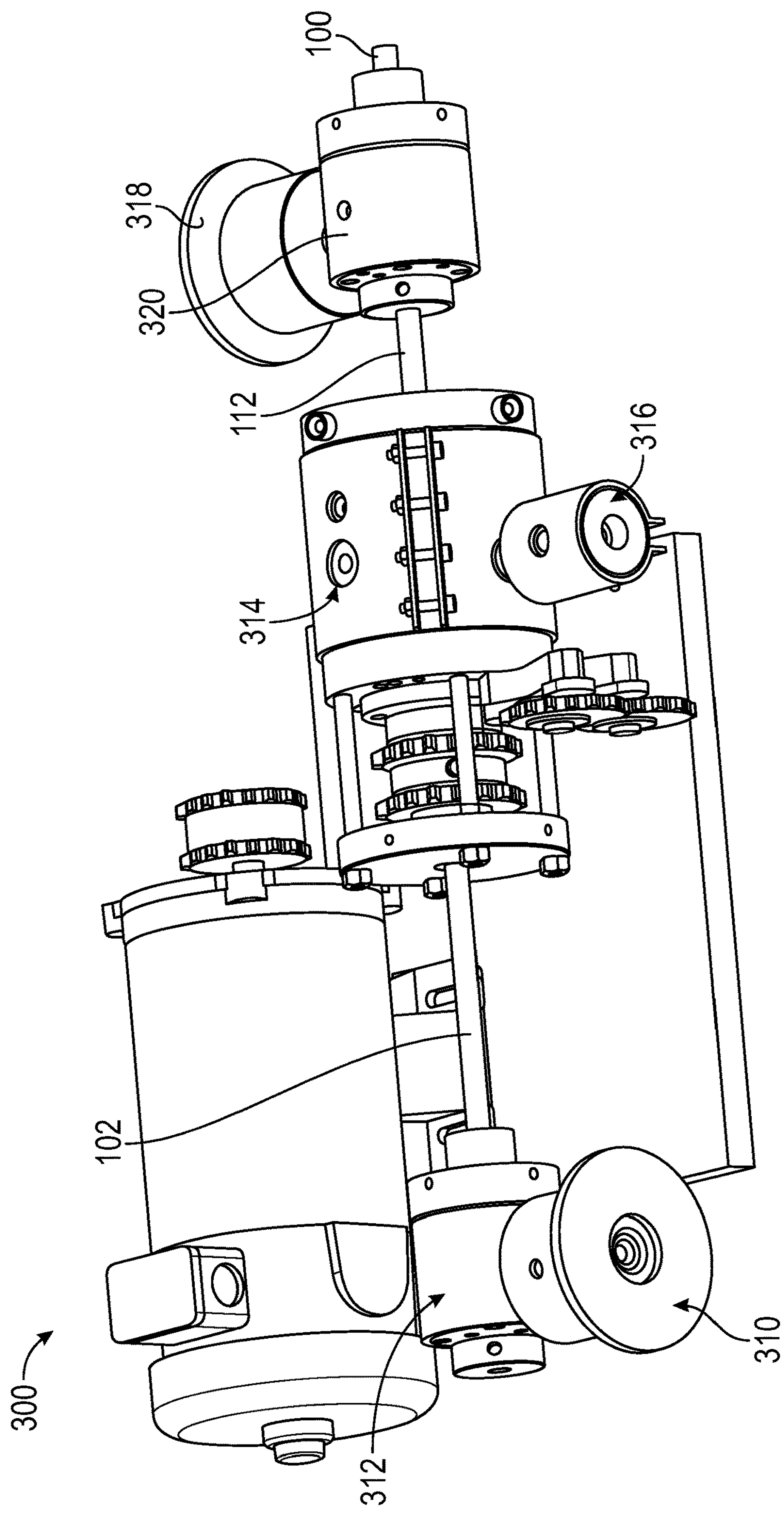
FIG. 16 is a perspective illustration of another extrusion assembly, according to another embodiment of the present invention.

Turning now to FIGS. 14-16, it is envisioned that in some embodiments, rather than forming the inner tube portion, braid, and outer tube portion nearly simultaneously, one or more of such inner tube portion, braid and/or outer tube portion may be formed in generally separate or discrete, and successive, operations. For example, FIGS. 14 and 15 illustrate an extrusion assembly 200 for the in-line manufacture of braid-reinforced tubing, according to another embodiment of the invention. As shown therein, the extrusion assembly 200 includes a first extruder device 210 that feeds an inline die or crosshead 212. The crosshead 212 may take the form of any crosshead or similar device commonly known in the art, and is configured to receive a first molten material for forming the inner tube portion of a braid-reinforced tube, as is known in the art. As further illustrated therein, the extrusion assembly 200 also includes a head 214 that is fed by a second extruder device 216 (for forming the braid) and a third extruder device (for forming the outer tube portion). In particular, a second molten material is fed to the head 214 by the second extruder device 216 to form the braid atop the outer peripheral surface of the inner tube portion, in the manner described above in connection with FIGS. 1-12. Likewise, a third molten material (which may be the same or different from the first molten material) is fed to the head 214 (simultaneously or near simultaneously with the second molten material) to form the outer layer/outer tube portion atop the braid, in the manner described above in connection with FIGS. 1-12.

With specific reference to FIG. 15, the head 214 may be configured similarly to the crosshead assembly 10 illustrated in FIG. 3, where like reference numerals designate like parts. In particular, the head 214 includes an outer deflector 16 having a bore extending there through, within which is concentrically mounted an outer spline 20. The outer spline 20 is operatively connected to an outer spline drive 22 that rotates the outer spline 20 about a central axis relative to the outer deflector 16. The outer spline 20 likewise includes a throughbore within which is concentrically mounted an inner spline 26, forming plenum 27 therebetween. The inner spline 26 is operatively connected to an inner spline drive 28 that rotates the inner spline 26 about the central axis. The inner spline 26 also includes a throughbore. Rather than housing an inner deflector (such as is the case in the embodiment of FIG. 3), the throughbore of the inner spline 26 is configured to receive already-formed inner tube portion 102 from the first extruder device 210 and inline die or crosshead 212. The second extruder device 216 and third extruder device 218, in conjunction with the inner and outer spline 26, 20, and deflector 16, therefore operate to form the braid and outer layer on the inner tube portion 102 in the manner described above in connection with the embodiment of FIGS. 1-12, to produce a finished braid reinforced tube 100.

AS illustrated in FIGS. 14 and 15, therefore, the extrusion assembly 200 includes a first extruder device 210 and inline die or crosshead 212 which is configured to form inner tube portion 102. The inner tube portion may then be passed directly to head 214 for formation of the braid 104 and outer layer 106 using second and third extruder devices 216, 218, respectively, in the manner described above in connection with FIGS. 1-12. In some embodiments, however, the inner tube portion 102 may be cooled (e.g., in a water bath) prior to feeding to the head 214.

It is further contemplated that each of the inner layer 102, braid 104 and outer layer 106 may be formed as individual, discrete steps. For example, with reference to FIG. 16, in an embodiment, an extrusion assembly 300 may include a first extruder device 310 that feeds an inline die or crosshead 312 to form the inner layer 102 of a braid reinforced tube. In particular, the first extruder device 310 and crosshead 312 may be configured as described above in connection with FIGS. 14 and 15 for producing a hollow tube 102 from a molten material. Rather than forming the braid and outer layer simultaneously as described above in connection with the embodiments of FIGS. 1-12 and 14-15, respectively, however, the braid 104 and outer layer 106 are formed successively using a second extruder device 316 that feeds a head 314 (to apply the braid to the outer periphery of the inner tube portion 102), and a third extruder device 318 that feeds a head 320 (to form the outer layer 106 over the braid 104 and inner layer 102).

In particular, the inner tube portion 102 is received by the head 314 and a braid is formed on the outer periphery of the inner tube portion 102 in the manner described above, using an outer spline and inner spline that rotate in opposite directions to form a crossing or overlapping reinforcing braid on the outer surface of the inner tube 102. As will be appreciated, therefore, the head 314 may be configured similarly to head 214, however the outer deflector may be omitted (as the outer layer is formed using a downstream extruder and die). As illustrated in FIG. 16, a tube 112 having an inner tube portion 102 and braid 104 exits the output end of the second head 314. The tube 112 is then passed to the third head 320, which is fed a molten material by the third extruder device 318, for applying the outer layer 106 around the inner layer 102 and braid 104. The third head 320 may include an outer deflector (e.g., outer deflector 16) mounted within a main body (e.g., main body 12), as described above, for applying the outer layer 106 to the braided inner layer to form tube 100.

It is preferred that in any implementation where the layers are not applied substantially simultaneously, that the extruder devices are positioned in tandem (in line with one another) so that the tube may be passed from one device to the next to form the required layers.

In some embodiments, the die or crosshead 212, 312 may (or may not) be mechanically attached to the braiding assembly (i.e., head 214 or 314). In an embodiment, a mandrel may extend from the head 212, 312 to help support the inner tube portion 102 as it is cooled and passed to the head 214 for application of the braid. It is further contemplated that in some embodiments, the inner tube portion 102 may be formed of multiple layers that have the same or different specifications or characteristics that provided certain desired benefits to the final tube assembly. For example, these benefits may include permeation resistance, lubricity, etc. In such a case, the additional layers that comprise the inner tube portion 102 may be formed by means known in the art. In addition, the inner tube portion 102 may be formed with multiple lumens rather than a single lumen, and then passed downstream for application of the braid and outer layer. Still further, in some embodiments, the inner tube portion 102, rather than being passed to the head 214 or 314 for application/formation of the braid, may be preformed and spooled offline, and then fed to the head 214 or 314 without the use of an inline first crosshead.

It is also contemplated that the teachings of the present invention may be utilized to produce an open weave braid without a supporting inner or outer layer. In this respect, the open weave braid may be a self-supporting structure capable of a variety of end uses.

In any of the embodiments described above, the extrusion assemblies of the present invention form the braid using an extruder that supplies molten braid material to rotating inner and outer splines. This allows for the elimination of expensive and noisy braiders, as well as the spools of monofilament from which the braiding has heretofore been formed. In particular, in contrast to existing systems and methods which required many spools of monofilament to be unwound and applied to the inner tube portion by expensive braiders, the present invention eliminates the use of any monofilament and the associated braiders, and instead forms the braid from a molten material that is applied to the inner tube portion.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An extrusion assembly, comprising:

a head having an outer spline rotatable in a first direction and an inner spline mounted concentrically with the outer spline and rotatable in a second direction opposite the first direction, the outer spline and the inner spline defining a plenum;

a first extruder device fluidly connected to the head and being configured to supply a first molten material to the head for forming an inner tube portion; and second extruder device fluidly connected to the head and being configured to supply a molten braid material to the plenum;

wherein the inner spline and the outer spline are operable to form an overlapping braid from the molten braid material over the inner tube portion.

2. The extrusion assembly of claim 1, wherein:

the inner spline includes a first plurality of angled flow channels formed on an outer periphery of a distal end thereof, the first plurality of angled flow channels being configured to distribute the molten braid material from the plenum.

3. The extrusion assembly of claim 2, wherein:

the outer spline includes a second plurality of angled flow channels formed on an inner periphery of a distal end thereof, the second plurality of angled flow channels being configured to distribute the molten braid material from the plenum.

4. The extrusion assembly of claim 3, further comprising:

an outer spline drive operatively connected to the outer spline for rotating the outer spline in the first direction; and an inner spline drive operatively connected to the inner spline for rotating the inner spline in the second direction.

5. The extrusion assembly of claim 1, further comprising:

a third extruder device fluidly connected to the head and being configured to supply a third molten material to the head for forming an outer tube portion over the overlapping braid and the inner tube portion;

wherein the overlapping braid is sandwiched between the outer tube portion and the inner tube portion.

6. The extrusion assembly of claim 5, wherein:

the head is configured to form the inner tube portion, the overlapping braid and the outer tube portion substantially simultaneously.

7. The extrusion assembly of claim 6, further comprising:

an outer deflector having a throughbore configured to receive the inner spline and the outer spline;

wherein the outer deflector is configured to receive the third molten material from the third extruder device.

8. The extrusion assembly of claim 7, further comprising:

an inner deflector received within a throughbore of the inner spline;

wherein the inner deflector is configured to receive the first molten material from the first extruder device.

9. The extrusion assembly of claim 1, further comprising:

a central passageway through which pressurized air is supplied for controlling an inner diameter of the inner tube portion.

10. The extrusion assembly of claim 1, wherein:

the molten braid material does not contact the first molten material until the molten braid material exits the plenum as the overlapping braid.

11. A method of manufacturing braid-reinforced tubing, comprising the steps of:

forming an inner tube portion having a lumen from a first molten material; and forming an overlapping braid pattern on an outer peripheral surface of the inner tube portion by:

rotating an outer spline in a first direction;

rotating an inner spline in a second direction opposite the first direction, the inner spline being concentrically mounted within the outer spline; and supplying a second molten material to a plenum formed between a distal end of the outer spine and a distal end of the inner spline;

wherein the second molten material exits the plenum through flow channels in the distal ends of the outer spline and the inner spline to form the overlapping braid pattern.

12. The method according to claim 11, further comprising the step of:

supplying a third molten material to an outer deflector having a throughbore;

wherein the outer spline and the inner spline are concentrically mounted within the throughbore;

wherein the outer deflector is configured to apply the third molten material as an outer layer over the inner tube portion and the overlapping braid pattern;

wherein the overlapping braid pattern and the outer layer are formed substantially simultaneously.

13. The method according to claim 11, wherein:

the flow channels are angled relative to a central axis about which the inner spline and outer spline rotate.

14. The method according to claim 11, further comprising the step of:

forming an outer layer over the inner tube portion and the overlapping braid pattern;

wherein the inner tube portion, the overlapping braid pattern and the outer layer are formed substantially simultaneously.

15. The method according to claim 11, further comprising the step of:

supplying pressurized air to a central passageway to control a diameter of the lumen.

16. The method according to claim 15, further comprising the step of:

adjusting a pressure of the air within the central passageway to vary the diameter of the lumen.

17. An extrusion assembly, comprising:

a head having:

an outer spline rotatable in a first direction;

an inner spline mounted concentrically with the outer spline and rotatable in a second direction opposite the first direction, the outer spline and the inner spline defining a plenum therebetween; and an outer deflector having a throughbore for receiving the inner spline and the outer spline a first extruder device fluidly connected to the head and being configured to supply a first molten material to plenum; and a second extruder device fluidly connected to the head and being configured to supply a second molten material to the outer deflector;

wherein the inner spline and the outer spline are operable to form an overlapping braid from the molten braid material and apply the overlapping braid over a tube having a lumen; and wherein the outer deflector is operable to form an outer layer over the overlapping braid.

18. The extrusion assembly of claim 17, wherein:

the inner spline includes a first plurality of angled flow channels formed on an outer periphery of a distal end thereof, the first plurality of angled flow channels being configured to distribute the first molten material from the plenum; and the outer spline includes a second plurality of angled flow channels formed on an inner periphery of a distal end thereof, the second plurality of angled flow channels being configured to distribute the first molten material from the plenum.

19. The extrusion assembly of claim 17, wherein:

the head is configured such that the first molten material does not contact the second molten material until the first molten material exits the plenum as the overlapping braid.

* * * * *